US011637588B2

(12) United States Patent
Tsiaflakis et al.

(10) Patent No.: US 11,637,588 B2
(45) Date of Patent: Apr. 25, 2023

(54) DIRECT CHANNEL CHARACTERIZATION FOR DISCONTINUOUS TIME-FREQUENCY OPERATION

(71) Applicant: Nokia Solutions and Networks Oy, Espoo (FI)

(72) Inventors: Paschalis Tsiaflakis, Schriek (BE); Alain Anderlini, Schaerbeek (BE); Danny Van Bruyssel, Bonheiden (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/077,598

(22) Filed: Oct. 22, 2020

(65) Prior Publication Data
US 2021/0135710 A1 May 6, 2021

(30) Foreign Application Priority Data
Oct. 31, 2019 (GB) .................................. 1915815

(51) Int. Cl.
*H04B 3/54* (2006.01)
*H04B 17/336* (2015.01)

(52) U.S. Cl.
CPC ............. *H04B 3/544* (2013.01); *H04B 3/546* (2013.01); *H04B 3/548* (2013.01); *H04B 17/336* (2015.01)

(58) Field of Classification Search
CPC ..................... H04L 15/0005; H04L 15/0007
See application file for complete search history.

(56) References Cited

U.S. PATENT DOCUMENTS

| 9,240,911 B1 * | 1/2016 | Laraway ............... H04L 7/0087 |
| 2010/0195478 A1 * | 8/2010 | Schenk .................. H04B 3/487 |
| | | 370/201 |

(Continued)

FOREIGN PATENT DOCUMENTS

| EP | 3039851 A1 | 7/2016 | |
| WO | WO-2007137281 A2 * | 11/2007 | ........... H04L 1/0045 |

(Continued)

OTHER PUBLICATIONS

Extended European Search Report received for corresponding European Patent Application No. 20198840.9, dated Apr. 19, 2021, 11 pages.

(Continued)

*Primary Examiner* — Kevin Kim
(74) *Attorney, Agent, or Firm* — Harness, Dickey & Pierce, P.L.C.

(57) ABSTRACT

A wired communication systems, a subscriber device and a method, and more specifically related to initialization and/or update of communication parameters used for communication through the wired communication systems. An access node comprises at least one processor and memory storing instructions that when executed by the at least one processor cause a local transceiver of the access node to transmit signaling data via a subscriber line to a remote transceiver, the signaling data identifying particular symbol positions within a sequence of symbols transmitted over the subscriber line during show-time as being suitable for characterizing a direct communication channel between the local transceiver and the remote transceiver.

19 Claims, 5 Drawing Sheets

(56) References Cited

U.S. PATENT DOCUMENTS

2015/0110038 A1* 4/2015 Yang .................. H04W 72/048
                                                    370/329
2020/0067748 A1* 2/2020 Zhang .................. H04W 16/28

FOREIGN PATENT DOCUMENTS

WO       2015/028545 A1      3/2015
WO       WO-2018029287 A1 *  2/2018  ........... H04L 1/0026

OTHER PUBLICATIONS

"Fast Access to Subscriber Terminals (G.fast)—Physical Layer Specification Amendment 1", Draft Amendment 1 to Recommendation ITU-T G.9701, vol. 4, Oct. 22, 2019, 537 pages.

"Fast Access to Subscriber Terminals (G.fast)—Physical Layer Specification", Series G: Transmission Systems and Media, Digital Systems and Networks, Access Networks—Metallic Access Networks, ITU-T G.9701, Mar. 2019, 516 pages.

"G.mgfast: DTFM: Discontinuous Time-Frequency Monitoring to Support DTFO mode in G.mgfast", International Telecommunication Union, Q4/15-C27 (191111), Study Group 15, Nokia Corporation, Nov. 2019, pp. 1-10.

"G.mgfast: Proposal for DOI using Time and Frequency Intervals Allocated to Single Line", International Telecommunication Union, T17-SG15-C-1424, Study Group 15, Broadcom, Jul. 2019, pp. 1-4.

"G.mgfast: Discontinuous Time-Frequency Operation (DTFO)", International Telecommunication Union, Q4/15-C8 (190923), Study Group 15, Broadcom Corporation, Sep. 2019, pp. 1-5.

"Draft Text for G.mgfast-PHY", International Telecommunication Union, Q4/15-TD45 (190923)-R05, Study Group 15, Editor G.mgfast, Sep. 2019, pp. 1-208.

Search Report received for corresponding United Kingdom Patent Application No. 1915815.3, dated Apr. 30, 2020, 3 pages.

European Office Action dated Jan. 12, 2023 issued in corresponding European Appln. No. 20198840.9.

* cited by examiner

US 11,637,588 B2

DIRECT CHANNEL CHARACTERIZATION FOR DISCONTINUOUS TIME-FREQUENCY OPERATION

CROSS-REFERENCE TO RELATED APPLICATION

This application claims the benefit of a United Kingdom patent application No. 1915815.3 filed on Oct. 31, 2019, titled "DIRECT CHANNEL CHARACTERIZATION FOR DISCONTINUOUS TIME-FREQUENCY OPERATION", the content of which is incorporated herein by reference in its entirety.

TECHNICAL FIELD OF THE INVENTION

The present invention relates to wired communication systems, and more specifically to initialization and/or update of communication parameters used for communication through the wired communication systems.

TECHNICAL BACKGROUND OF THE INVENTION

In ITU SG15-Q4 meetings of Jul. 1-12 and Sep. 23-27, 2019, Discontinuous Time-Frequency Operation (DTFO) mechanism was proposed for G.mgfast recommendation. It corresponds to a transmission mode that splits the logical frame over time into two non-overlapping time intervals: NOI and DOI, and splits the communication spectrum into two non-overlapping bands: Band0 and Band1.

For example, Band0 may refer to legacy [0-106 MHz] G.fast spectrum band, while Band1 may refer to new [106-212 MHz] G.fast spectrum band. In another example, Band0 may refer to [0-106 MHz] or [0-212 MHz] G.fast spectrum band, while Band1 may refer to [106-424 MHz] or [212-424 MHz] G.mgfast spectrum band respectively.

During the symbol positions of the NOI, Band0 may be active for more than one transmitter of the vectored group (up to all of the transmitters of the vectored group), whereas Band1 may be active only for one single transmitter of the vectored group. That is to say, during NOI, vectored operation is supported for all lines over Band0, but only single line non-vectored operation is supported over Band1. During the active symbol positions of the DOI, only one single transmitter of the vectored group is allowed to be active over Band0 and Band1. That is to say, during DOI, only single line non-vectored operation is supported over Band0 and Band1. The splitting points of the logical frame and of the spectrum is selected by the MTU-O for both the upstream and downstream directions. In addition, RMC control parameters were proposed for DTFO.

FIG. 1 showcases an illustrative example of DTFO operation for two lines L1 and L2. Both lines transmit in Band0 during the full NOI interval. Line L1 transmits in Band1 during the third and fourth symbol positions of the NOI (as configured by TA_B1 and T_B1 parameters), and line L1 also transmits in Band0 and Band1 during five symbol positions of the DOI (as configured by TTR, TBUDGET and TA parameters). Line L2 only transmits in Band0 during the NOI.

With DTFO, Band0 can be used to offer a sustained data rate to all users with the use of vectoring, whereas Band1 can be used to allocate extra peak rate to users in a time-shared fashion. The allocation of extra peak rate to users may be based on traffic load offered by the user(s).

To obtain a good user experience, the allocation of extra peak rate to a particular user should happen on a millisecond scale. To be able to allocate extra DTFO bands for user data transmission (e.g., Band1 in NOI, Band0+Band1 in DOI) to a line in a seamless way (i.e., without undue delay or errors), it is important to have a receiver that is "always ready" for these extra bands to be activated. Therefore, the receiver functions need to be initially brought in such a "ready state" and later maintained in the "ready" state for the lines that do not have the DTFO bands allocated for user data transmission. The receiver functions are functions such as the determination of the TEQ (Time Domain Equalizer) and FEQ (Frequency Domain Equalizer), estimation of the Signal to Noise Ratio (SNR), and determination of the bit loading (bi) and transmit gains (gi). For each of these receiver functions, one can distinguish two operation modes (or phases): determining initial values ("initialization" or "training" mode), and updating the values ("tracking" mode).

In G.fast technology, during SHOWTIME (i.e., during transmission of user data over the subscriber line), only tracking mode is possible for the receiver functions, typically using received DATA symbols. If a sub-carrier or band is not used, receiver functions can neither be initialized nor updated.

For DTFO operation in G.fast, whenever a DTFO band is to be activated for a particular user, the corresponding parameters of the receiver functions (e.g., TEQ, FEQ, SNR, bit loading, transmit gain) may be outdated or even non-existing.

In G.mgfast technology, during SHOWTIME, "initialization" and "tracking" mode would be possible for the receiver functions using SYNC symbols (as all sub-carriers are transmitted on SYNC symbols).

For DTFO operation in G.mgfast, whenever a DTFO band is to be activated for a particular user, the corresponding parameters of the receiver functions (e.g., TEQ, FEQ, SNR, bit loading, transmit gain) could be initialized or updated. However, two issues exist. A first issue (in downstream only) is the fact that the SYNC symbols can be precoded, non-precoded, or even absent (Zi=0), without the xTU-R receiver being aware. As a second issue, because only a single SYNC symbol is available per superframe (e.g., every 6 ms for a logical frame of MF=36 symbols), such an "initialization" or "tracking" would be too slow for the desired "millisecond scale" speed of allocation of extra rate to a specific user, and too slow to follow rapid changes in the cable characteristics.

Prior art on DTFO can be found in the following two recent ITU contributions:

T17-SG15-C-1424, Broadcom Corporation, "G.mgfast: Proposal for DOI using time and frequency intervals allocated to single line", Geneva, July 2019; and T17-SG15-C-0008, Broadcom Corporation and Intel Inc., "G.mgfast: Discontinuous Time-Frequency Operation (DTFO)", Madrid, September 2019.

G.mgfast technology prior art can be found in the draft standard T17-SG15RGM-Q4-190923-TD-0045-R05, "Draft text for G.mgfast-PHY", Sep. 23, 2019.

G.fast technology prior art can be found in the ITU-T G.9701 (March 2019) approved standard.

SUMMARY OF THE INVENTION

It is an object of the present invention to allow fast and seamless band allocation for DTFO during SHOWTIME.

In accordance with a first aspect of the invention, an access node comprises at least one processor and memory storing instructions that when executed by the at least one processor cause a local transceiver of the access node to transmit signaling data via a subscriber line to a remote transceiver, the signaling data identifying particular symbol positions within a sequence of symbols transmitted over the subscriber line during show-time as being suitable for characterizing a direct communication channel between the local transceiver and the remote transceiver.

Such an access node typically refers to a Digital Subscriber Line Access Multiplexer (DSLAM) for xDSL communication over a subscriber line, or to a Distribution Point Unit (DPU) for G.fast or G.mgfast communication over a subscriber line.

In one embodiment of the access node, the characterized direct communication channel is a direct communication channel from a local transmitter within the local transceiver to a remote receiver within the remote transceiver.

Alternatively, the characterized direct channel is a direct communication channel from a remote transmitter in the remote transceiver to a local receiver in the local transceiver.

In one embodiment of the access node, the characterization of the direct communication channel is restricted to a first portion of a communication spectrum used for communication between the local transceiver and the remote transceiver.

In one embodiment of the access node, at least one sub-carrier of symbols transmitted during the particular symbol positions and belonging to a second non-overlapping portion of the communication spectrum are modulated with user data or with Robust Management Channel RMC data.

In one embodiment of the access node, the particular symbol positions correspond to particular SYNC symbol positions.

In one embodiment of the access node, the characterization of the direct communication channel comprises at least one of:
  initializing or updating coefficients of a channel equalizer;
  determining at least one SNR on at least one sub-carrier;
  determining at least one bit loading achievable on at least one sub-carrier; or
  determining at least one transmit gain for at least one sub-carrier.

In one embodiment of the access node, at least one sub-carrier of symbols transmitted during the particular symbol positions are modulated with a probe sequence chosen from a set of mutually orthogonal probe sequences.

Alternatively, at least one sub-carrier of symbols transmitted during the particular symbol positions are modulated with a pseudo-random data sequence.

In one embodiment of the access node, the instructions when executed by the at least one processor further causes the local transceiver to transmit further signaling data via the subscriber line to the remote transceiver, the further signaling data being indicative of an allowable type of channel characterization usable by the remote receiver.

In one embodiment of the access node, the allowable type of channel characterization comprise correlating signal measurements performed by the remote receiver during the particular symbol positions on the at least one sub-carrier with elements of the probe sequence used by the local transmitter.

In one embodiment of the access node, the characterization of the direct communication channel comprises correlating signal measurements performed by the local receiver during the particular symbol positions on the at least one sub-carrier with elements of the probe sequence used by the remote transmitter.

In one embodiment of the access node, the particular symbol positions refer to relative positions within a Time Division Duplexing TDD frame, or a logical frame, or a superframe.

In accordance with another aspect of the invention, a subscriber device comprises at least one processor and memory storing instructions that when executed by the at least one processor causes a local transceiver of the subscriber device to receive signaling data via a subscriber line from a remote transceiver, the signaling data identifying particular symbol positions within a sequence of symbols transmitted over the subscriber line during show-time as being suitable for characterizing a direct channel between the local transceiver and the remote transceiver.

Such a subscriber device typically refers to a xDSL or G.fast or G.mgfast residential gateway.

In one embodiment of the subscriber device, the characterized direct communication channel is a direct communication channel from a remote transmitter in the remote transceiver to a local receiver in the local transceiver, and wherein the instructions when executed by the at least one processor further causes the local receiver, in response to the reception of the signaling data, to characterize the direct communication channel during the particular symbol positions.

In one embodiment of the subscriber device, the characterization of the direct communication channel comprises at least one of:
  initializing or updating coefficients of a channel equalizer;
  determining at least one SNR on at least one sub-carrier;
  determining at least one bit loading achievable on at least one sub-carrier; or
  determining at least one transmit gain for at least one sub-carrier.

In one embodiment of the subscriber device, the characterization of the direct communication channel comprises correlating signal measurements performed by the local receiver during the particular symbol positions on at least one sub-carrier with elements of a probe sequence chosen from a set of mutually orthogonal probe sequences and used by the remote transmitter to modulate the at least one sub-carrier during the particular symbol positions.

In one embodiment of the subscriber device, the characterized direct communication channel is a direct communication channel from a local transmitter in the local transceiver to a remote receiver in the remote transceiver, and wherein the instructions when executed by the at least one processor further causes the local transmitter, in response to the reception of the signaling data, to modulate at least one sub-carrier of symbols transmitted during the particular symbol positions with a probe sequence chosen from a set of mutually orthogonal probe sequences or with a pseudo-random data sequence.

In accordance with still another aspect of the invention, a method for initializing or updating communication parameters within a wired communication system comprises transmitting signaling data via a subscriber line from a local transceiver of an access node to a remote transceiver, the signaling data identifying particular symbol positions within a sequence of symbols transmitted over the subscriber line during show-time as being suitable for characterizing a direct communication channel between the local transceiver and the remote transceiver.

Embodiments of the method correspond with the aforementioned embodiments of the access node and of the subscriber device.

A new scheme is proposed that allows for fast and seamless band allocation and re-allocation in the context of DTFO, or in other contexts such as P2MP transmission.

This involves exchanging signaling data over a subscriber line. The signaling data indicate (or are indicative of) one or more ranges of symbol positions within a Time Division Duplexing (TDD) frame, a logical frame, or a superframe, that can be used for characterizing a direct communication channel over the subscriber line between two peer transceivers. The particular symbol positions are configured by a communication controller within the access node. The particular symbol positions can refer to particular SYNC symbol positions, to particular RMC symbol positions during NOI, or to particular DATA symbols positions during NOI or DOI.

During these particular symbol positions, the sub-carriers of the DTFO band(s) are modulated with a probe sequence chosen from a set of mutually-orthogonal probe sequences. The use of mutually-orthogonal probe sequences allows for parallel characterization over a plurality of lines. In order to reject the contribution from the neighboring lines on account of the various crosstalk couplings, the channel characterization further involves correlating signal measurements performed by a receiver during the particular symbol positions on at least one sub-carrier with elements of the probe sequence used by a peer transmitter to modulate the at least one sub-carrier.

Alternatively, the sub-carriers of the DTFO band(s) are modulated with a Pseudo-Random Binary Sequence (PRBS) generated by a PRBS generator in some pre-determined way. This scheme allows for sequential characterization over successive subscriber lines, and further improves the channel characterization due to the higher randomness of the transmit pattern.

The characterization of the direct channel is performed by the receiver during these particular symbol positions. The characterization of the direct channel involves initializing or updating the coefficients of a TEQ or FEQ, or determining initial or updated values for SNR, bit loading or transmit gains on at least one sub-carrier.

The characterization of the direct channel may be restricted to a sub-portion (e.g., Band1 during NOI) of the available communication spectrum (e.g., the MEDLEY set). The sub-carriers not belonging to the characterized portion (e.g., band0 during NOI) can keep on carrying payload data during these particular symbol positions.

Once the channel characterization is complete, these particular symbol positions may be released for carrying usual payload traffic.

The proposed scheme allows to learn and track the direct channels for the lines for which Band1 is not (yet) allocated for user data transmission in NOI, and/or for which Band0+ Band1 is not (yet) allocated for user data transmission in DOI.

Furthermore, the proposed scheme allows the access node to closely control the learning and tracking of the direct channels at subscriber side (instead of relying on some default behavior for the channel characterization). For instance, the access node can make sure that a suitable precoder or postcoder is installed during particular symbol positions before signaling these symbol positions as being suitable for learning or tracking the direct channels. In this case, the term "direct channel" is to be interpreted as the "precoded direct channel" in downstream, or as the "postcoded direct channel" in upstream.

DETAILED DESCRIPTION OF THE INVENTION

Various example embodiments will now be described more fully with reference to the accompanying drawings wherein.

Figure 1:
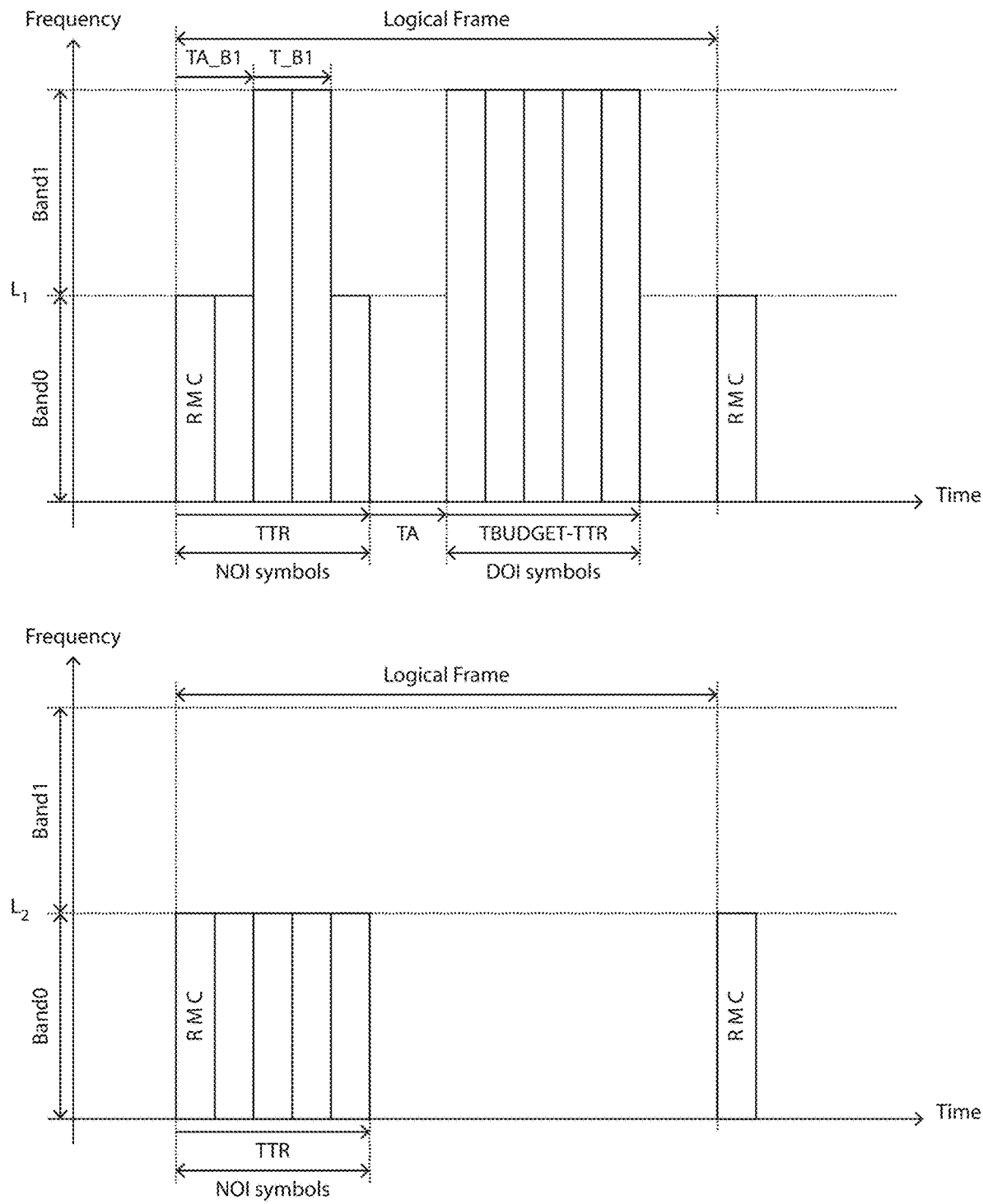
FIG. 1 represents an overview of DTFO.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPU), Digital Signal Processors (DSP), Application Specific Integrated Circuits (ASIC), Field Programmable Gate Arrays (FPGA), System-on-Chip (SoC), micro-controller, or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive), optical (e.g., a compact disk read only memory, or "CD ROM"), and may be read-only memory (ROM), random access memory (RAM), flash memory (e.g., USB flash drives, memory cards, memory sticks, etc.), for example. The terms "tangible storage medium" and "memory" may be used interchangeably. Example embodiments are not limited by these aspects of any given implementation.

Figure 2:
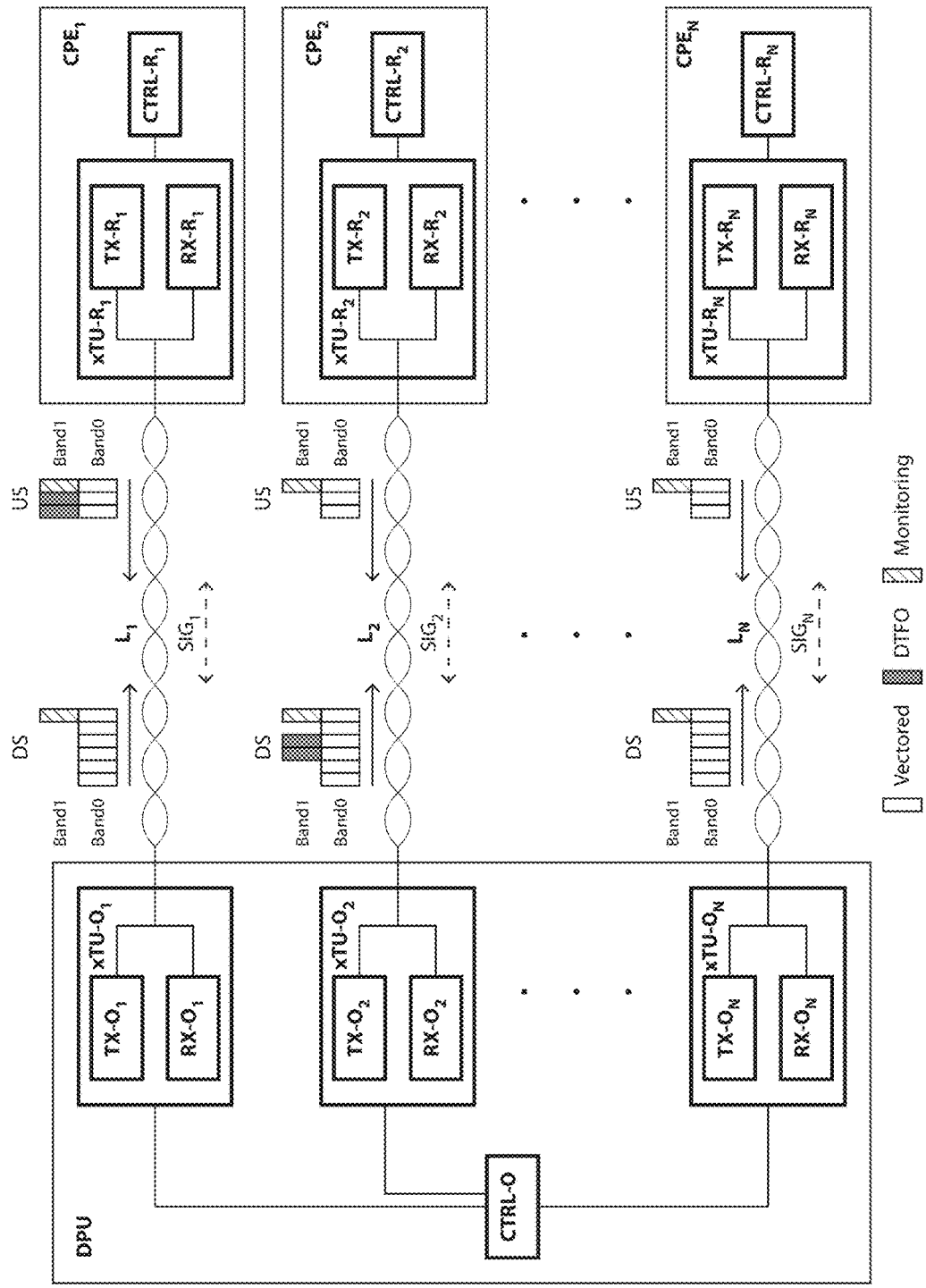
FIG. 2 represents an overview of a wired communication system.

There is seen in FIG. 2 a schematic of a typical DSL system, in which an access node at a distribution point, further referred to as Distribution Point Unit (DPU), is connected to N Customer Premise Equipment (CPE) $CPE_1$ to $CPE_N$ through respective copper twisted pairs $L_1$ to $L_N$. The DPU comprises N local transceivers $xTU-O_1$ to $xTU-O_N$ respectively coupled to peer remote transceivers $xTU-R_1$ to $xTU-R_N$ at subscriber side. The local transceiver $xTU-O_i$ (with i denoting a line index ranging from 1 to N) comprise a transmitter $TX-O_i$ and a receiver $RX-O_i$. Similarly, the remote transceivers $xTU-R_i$ comprise a transmitter $TX-R_i$ and a receiver $RX-R_i$.

The DPU further comprises a communication controller CTRL-O coupled to the transceivers $xTU-O_1$ to $xTU-O_N$, and the CPE $CPE_i$ comprises a communication controller $CTRL-R_i$ coupled to the transceiver $xTU-R_i$ (with again i denoting a line index ranging from 1 to N). The communication controllers CTRL-O and $CTRL-R_i$ control the communication parameters to be used over the respective subscriber line $L_i$ for communication between the DPU and the CPE $CPE_i$. Some of the communication parameters are exchanged between the central controller CTRL-O and the remote controllers $CTRL-R_i$ through the respective transceivers (see '$SIG_i$' in FIG. 2), for instance through the Embedded Operation Channel (EOC) or through the Robust Management Channel (RMC).

There is also plotted in FIG. 2 the sequences of symbols transmitted over the respective subscriber lines $L_1$ to $L_N$. The lines $L_1$ to $L_N$ transmit over Band0 during all 6 downstream (DS) symbol positions, and lines $L_1$ to $L_N$ transmit over Band0 during all 3 upstream (US) symbol positions. These concurrent transmissions over Band0 are vectored for crosstalk mitigation (see white blocks 'vectored' in FIG. 2). As an illustration of DTFO, $L_2$ is shown as being boosted in downstream by using Band1 during the third and fourth symbol positions, and $L_1$ is shown as being boosted in upstream by using Band1 during the first two symbol positions (see shaded blocks 'DTFO' in FIG. 2). A monitoring symbol is configured for Band1 during the $6^{th}$ symbol position in downstream, and during the $3^{rd}$ symbol position in upstream (see cross-hatched blocks 'Monitoring' in FIG. 2).

xDSL, G.fast and G.mgfast technologies are based on Discrete Multi-Tone (DMT) modulation, in which a large number of sub-carriers or tones are used to transmit information.

Figure 3A:
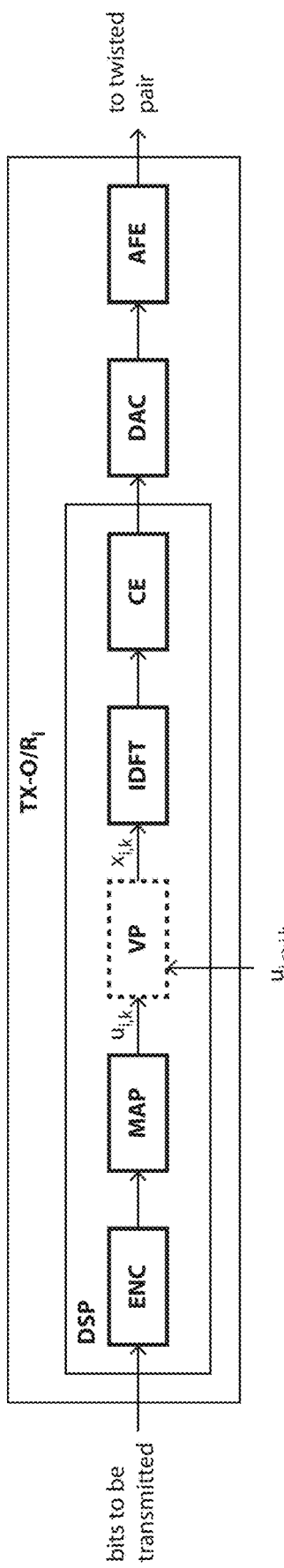
FIGS. 3A and 3B represent the main functional blocks of a receiver and transmitter respectively.

FIG. 3A shows the relevant functional blocks of a DSL transmitter TX-Oi at the access node (signals flow from left to right). The transmitter TX-Oi consists of a Digital Signal Processor (DSP), and an Analogue Front End (AFE). In the DSP, the bits to be transmitted are first encoded, for instance for forward error correction, and then fed to a mapper (MAP) which generates complex IQ samples $u_{i,k}$ for the respective sub-carriers (with i denoting a line index from 1 to N, and k denoting a sub-carrier index). The IQ samples of the sub-carriers $u_{i,k}$ are then fed to a Vectoring Processor (VP) for signal precoding, which at the same time gets further IQ samples $u_{j\neq i,k}$ from other transmitters, and jointly processes them for generating precoded samples $x_{i,k}$. The precoded samples $x_{i,k}$ are then fed to an Inverse Discrete Fourier Transform (IDFT) block, which may be implemented using an Inverse Fast Fourier Transform (IFFT), which generates corresponding time samples. The time samples are then fed to a CE block, which adds a cyclic extension (CE) which includes a cyclic prefix (CP) and a cyclic suffix (CS), i.e. a partial copy of the signal prepended at the beginning or at the end of the signal. The addition of the CE is necessary to avoid inter-symbol-interference (ISI) and inter-carrier-interference (ICI). The sequence of time samples may be subject to some time-windowing to mitigate ICI and the spectral leakage during symbols transitions. The sequence of time samples, which forms the full time domain waveform of one DMT symbol, is then fed to a Digital-to-Analog Converter (DAC), which generates an analog output signal that, using an Analog Front End (AFE), is amplified and transmitted over a twisted pair (or any other physical medium).

Figure 3B:
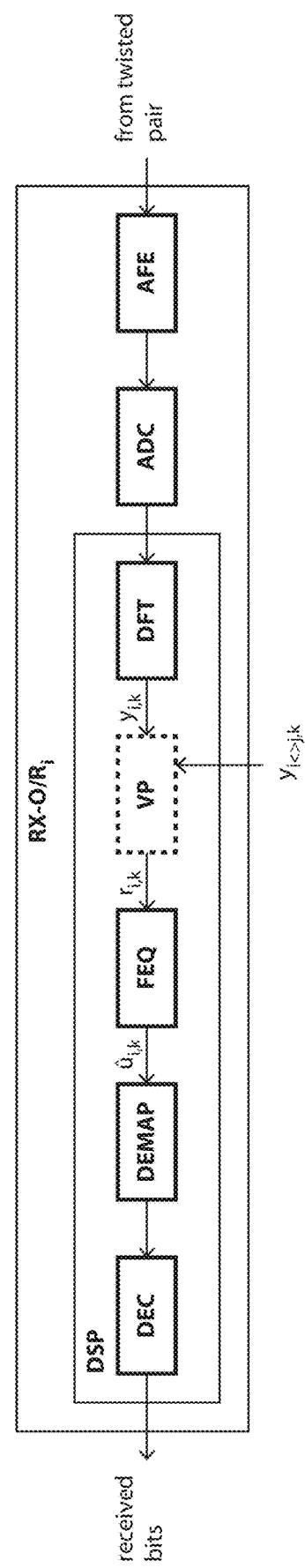

FIG. 3B shows the relevant functional blocks of a DSL receiver RX-Oi at the access node (signals flow from right to left). The AFE of the receiver picks up the receive analog signals from a twisted pair, amplifies it with a variable gain and low noise amplifier to fit the dynamic range of an Analog-to-Digital Converter (ADC), and sends it to the ADC, which converts it to digital time samples. Optionally, the receiver can implement a time domain equalizer (TEQ; not shown in FIG. 3B) before conversion to the frequency domain in order to reduce ISI-ICI. A Discrete Fourier Transform (DFT) block first selects an appropriate part of the sequence of receive time samples (not or little impaired by ISI-ICI), and then applies the DFT, which may be implemented using a Fast Fourier Transform (FFT). The DFT block generates complex IQ samples $y_{i,k}$ for the respective sub-carriers (with again i denoting a line index from 1 to N, and k denoting a sub-carrier index). The complex IQ samples of the different sub-carriers $y_{i,k}$ are then fed to a VP for signal postcoding, together with the IQ samples $y_{j \neq i,k}$ from other receivers. The postcoded signal $r_{i,k}$ output by the VP for line $L_i$ is then fed to a frequency domain equalizer (FEQ) to obtain equalized postcoded samples $\hat{u}_{i,k}$. A demapper (DEMAP) and a decoder (DEC) converts the equalized IQ samples into a stream of bits.

The remote transmitter TX-$R_i$ and the remote receiver RX-$R_i$ are similar, but without the VP block as no signal coordination/vectoring is possible at the subscriber side.

The communication controllers CTRL-O and CTRL-$R_i$ can be part of the DSP, for instance part of one or more management layers, or of a separate processor like an On-Board Controller (OBC), or partly implemented in the DSP and in a separate processor.

Further we consider that the DSL system operates in DTFO like mode. This means that, during any given DMT symbol position of the NOI, more than one line may be active in Band0, whereas only a single line is allowed to be active in Band1 (so vectoring and corresponding VP resources are disabled on Band1). Further, during any given DMT symbol position of the DOI, only a single line is allowed to be active in Band0 and Band1.

Figure 4:
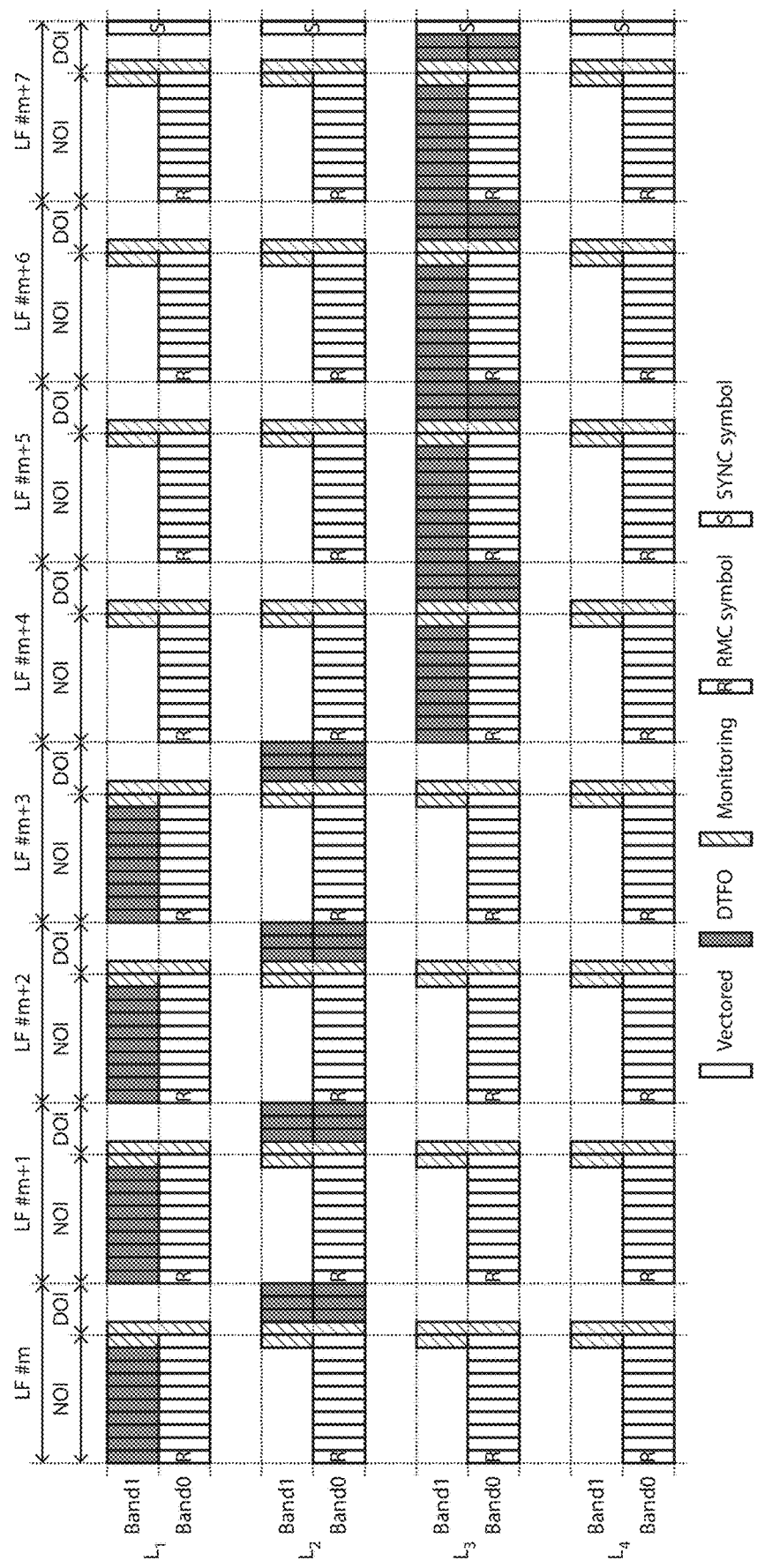
FIGS. 4 and 5 represent the various symbol types transmitted over 4 subscriber lines, including monitoring symbols configured as per the present invention.

An example is shown in FIG. 4. This example shows the downstream symbols of 8 successive logical frames LF #m to LF #m+7 of a superframe (with m denoting some logical frame index) transmitted over 4 lines $L_1$ to $L_4$. The logical frames consist of 14 downstream (DS) symbol positions. The logical frames are further divided into a NOI of 10 symbols, and a DOI of 4 symbols. There is one SYNC symbol per superframe (see blocks marked with 'S' at the end of the superframe in FIG. 4). During the first 4 logical frames LF #m to LF #m+3, Band1 is allocated to line $L_1$ during NOI, whereas Band0+Band1 is allocated to line $L_2$ during DOI (see shaded DTFO blocks over lines $L_1$ and $L_2$ in FIG. 4). During the next 4 logical frames LF #m+4 to LF #m+7, Band1 is allocated to line $L_3$ during NOI, and Band0+Band1 is allocated to line $L_3$ during DOI (see shaded DTFO blocks over line $L_3$ in FIG. 4).

During SHOWTIME (i.e., during transmission of user data after line initialization), the communication controller CTRL-O at the access node signals towards each communication controller CTRL-$R_i$ (at the particular $CPE_i$) the range of symbol positions that are suitable for characterization of a direct communication channel over line Li between the local transceiver xTU-$O_i$ (at the DPU) and the remote transceiver xTU-$R_i$ (at the CPE $CPE_i$). This can be a downstream direct communication channel, i.e. from the DPU towards the CPE, and/or an upstream direct communication channel, i.e. from the CPE towards the DPU. Channel characterization can take place during NOI and/or DOI. The range of symbol positions suitable for channel characterization during NOI and/or DOI is signaled through the EOC or RMC channel.

The particular symbol positions that can be used during NOI and/or DOI for channel characterization, and the one or more frequency bands over which channel characterization can take place, are referred to as monitoring symbols and monitoring bands respectively. The monitoring symbols are the symbols in the range indicated by the communication controller CTRL-O as being suitable for channel characterization during NOI and DOI respectively. During the monitoring symbols of the NOI, channel characterization is typically restricted to Band1 as Band0 may be used for carrying payload data; during the monitoring symbols of the DOI, channel characterization typically takes place over both Band0 and Band1. Thus, the monitoring band for NOI is Band1, whereas the monitoring band for DOI is Band0+Band1.

Alternatively, channel characterization during DOI can be restricted to Band0, while relying on Band1 characterization during NOI, and provided the direct channels over Band1 do not change between NOI and DOI (e.g., single-line non-vectored operation over Band1 during both NOI and DOI).

For parallel or concurrent channel characterization, the sub-carriers of the monitoring band can be modulated from symbol to symbol with a probe sequence selected from a set of mutually orthogonal probe sequences (e.g., Walsh Hadamard binary sequences). The probe sequence used over Band1 can be the same as the one used over Band0 (following the same frequency pattern), or the probe sequence used over Band1 is distinct from the one used over Band0.

For sequential channel characterization, the sub-carriers of the monitoring band can be modulated with a PRBS generated by a PRBS generator in some pre-determined way. The PRBS generator may be running in the so-called "RESET" mode, meaning that all monitoring symbols are modulated with the same pattern, or may be running in the so-called "FREE-RUNNING" mode, in which case the pattern is changing from one monitoring symbol to the next. The latter may improve the channel characterization due to the higher randomness across the monitoring symbols achieving a peak to average power ratio PAR closer to that of regular DATA symbols.

For further improved characterization (e.g. in case of high non-linearities), the Band1 monitoring symbols during NOI may be sent at DMT symbols positions on which in Band0 DATA symbols are present. In G.fast or G.mgfast technology, this is guaranteed during the first MNDSNOI DATA symbols of the NOI. Alternatively, the CTRL-O may decide to send dummy data in Band0 in order to create full power symbols during the monitoring symbols in NOI.

FIG. 4 gives an example of concurrent channel characterization over the lines $L_1$ to $L_4$. The controller CTRL-O has signaled to use the 10th NOI symbol position of all lines for characterizing the respective downstream direct channels in NOI on Band1 (including the lines that do not use Band1 for data transmission during NOI). Further the controller CTRL-O has signaled to use the 1st DOI symbol position of all lines for characterizing the respective downstream direct channels in DOI on Band0+Band1 (including the lines that do not use Band0+Band1 for data transmission during DOI).

In order to speed up the characterization time, we suggest to use commands and/or messages sent through the RMC for signaling the relative positions of the monitoring symbols in NOI and DOI in one or more following logical frames. Example of RMC parameters that can be used for this signaling are as follows (these parameters need to be instantiated for DS and US directions respectively).

A first RMC parameter indicates whether SYNC symbols can be used for characterization of the direct communication channel, or whether additional monitoring symbols are used.

Further RMC parameters indicate the positions of the monitoring symbols in Band1 for NOI:

TA_NOI_MON: this parameter indicates the first NOI monitoring symbol position (relative to the start of the downstream or upstream logical frame) to be used for channel characterization in Band1.

TB_NOI_MON: this parameter indicates the number of contiguous NOI monitoring symbol positions to be used for channel characterization in Band1.

Further RMC parameters indicate the symbol positions of the monitoring symbols in Band0+Band1 for DOI:

TA_DOI_MON: this parameter indicates the first DOI symbol monitoring symbol position (relative to the start of the downstream or upstream logical frame) to be used for channel characterization in Band0+Band1.

TB_DOI_MON: this parameter indicates the number of contiguous DOI symbol positions to be used for channel characterization in Band0+Band1.

For FIG. 4, the parameter values for NOI are TA_NOI_MON=10 and TB_NOI_MON=1 for all lines; and the parameter values for DOI are TA_DOI_MON=11 and TB_DOI_MON=1 for all lines.

There are different direct communication channel characterization functionalities:

initializing or updating the coefficients of a time domain channel equalizer (TEQ);

initializing or updating the coefficients of a frequency domain channel equalizer (FEQ) for the sub-carriers of Band1 (NOI) or the sub-carriers of Band0+Band1 (DOI);

determining a Signal to Noise Ratio (SNR) on the sub-carriers of Band1 (NOI) or the sub-carriers of Band0+Band1 (DOI);

determining a bit loading (bi) achievable on the sub-carriers of Band1 (NOI) or the sub-carriers of Band0+Band1 (DOI); or determining a transmit gain (gi) for the sub-carriers of Band1 (NOI) or the sub-carriers of Band0+Band1 (DOI), e.g. for fine tuning the transmit gains and removing the extra noise margin.

For FEQ tracking multiple methods can be employed as in prior art, such as iterative methods like LMS, block-LMS, RLS, non-linear, or non-iterative methods like one shot estimate.

Figure 5:
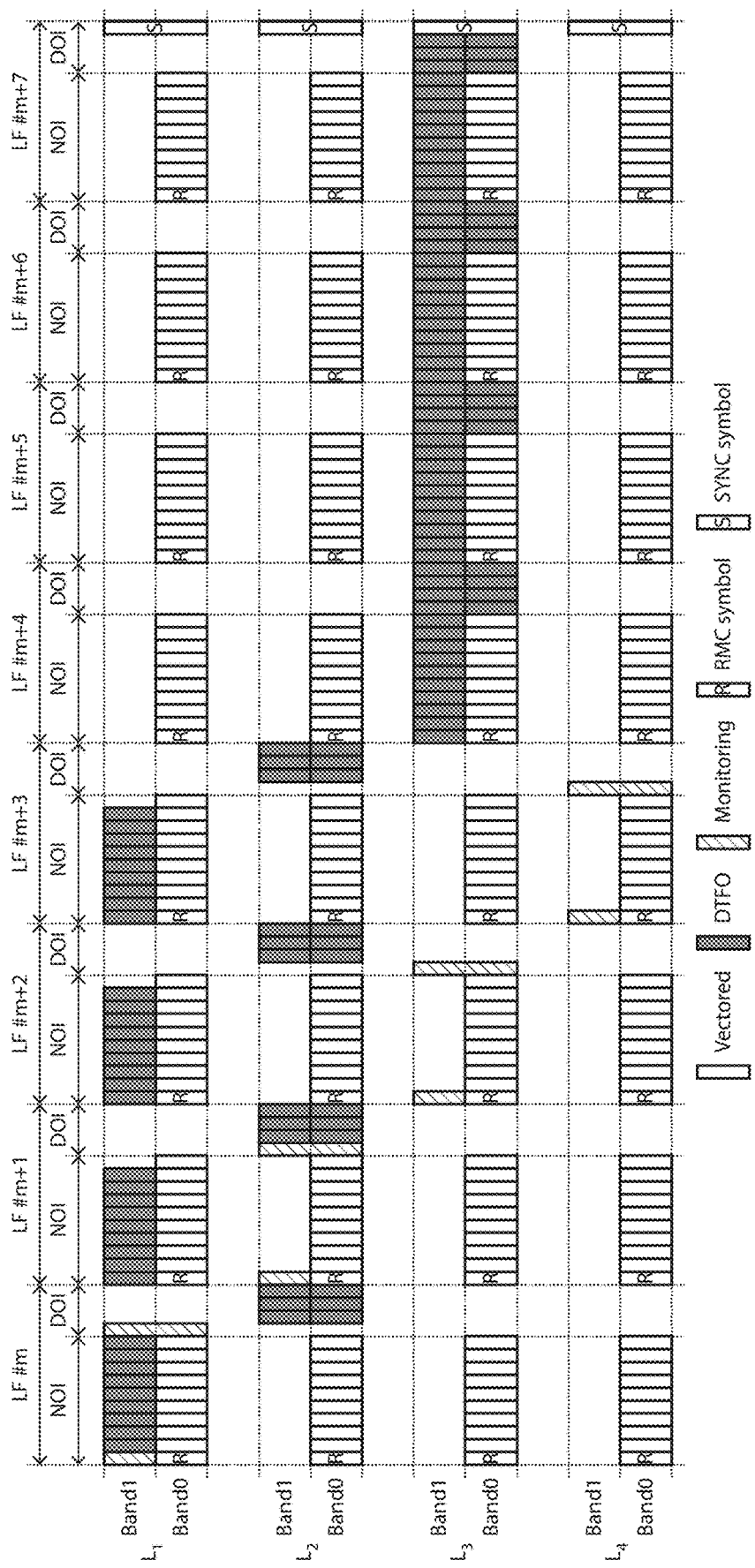

FIG. 5 gives an example of sequential channel characterization over the lines $L_1$ to $L_4$. The 1st symbol position of the NOI of the first logical frame LF #m (i.e., the RMC symbol position; see blocks marked with 'R' in FIG. 5) is used for the characterization of the direct communication channel on Band 1 over line $L_1$ during NOI. The first symbol position of the NOI of the second logical frame LF #m+1 is used for line $L_2$, the first symbol position of the NOI of the third logical frame LF #m+2 is used for line $L_3$, and the first symbol position of the NOI of the fourth logical frame LF #m+3 is used for line $L_4$. During these symbol positions of the NOI, the other lines (e.g., lines $L_2$ to $L_4$ for the first logical frame LF #m) do not transmit on Band1 (Zi=0) so as to emulate single-line operation over Band1 for the line that is being characterized (e.g., line $L_1$ for the first logical frame LF #m).

The monitoring symbols of the DOI are similarly configured in a sequential way during the first symbol position of the DOI of the logical frames LF #m to LF #m+3, but now over Band0+Band1. During these symbol positions of the DOI, the other lines do not transmit at all so as to emulate single-line operation over Band0+Band1 for the line that is being characterized.

DTFO allocation of Band1 during NOI and of Band0+Band1 during DOI is as per FIG. 4, with lines $L_1$ ad $L_2$ boosting during the first 4 logical frames and line $L_3$ boosting during the next 4 logical frames.

A further RMC parameter indicates whether the characterization of the direct communication channel is using a concurrent or sequential method so as the remote receiver RX-$R_i$ can apply an appropriate method for learning or tracking the direct communication channel (e.g., with or without correlation).

Once the controllers signaled the particular symbol positions to use for characterization of the direct communication channels, the actual process of characterization can start. We now present the sequence of steps that can be followed for a first use case, namely downstream, NOI, parallel characterization over Band1.

In this case, during SHOWTIME, we are in a situation where only Band0 is active for sending DMT symbols. The local transmitters TX-$O_i$ have been informed on the PSD, the fixed pattern to modulate the sub-carriers within the symbol, and the probe sequence (chosen from a set of mutually orthogonal probe sequences) to be used over the successive monitoring symbols for characterization of Band1. The content of the probe sequence is determined by the CTRL-O for the respective transmitters TX-$R_i$. We note that the length of the probe sequence is preferably a power of two, and so is preferably the number of monitoring symbols configured per logical frame (so as to restore some periodicity across logical frames). Each element of the probe sequence is selected from the finite set $\{-1,0,1\}$. Further, the remote receivers Rx-Ri have been informed on the PSD, the respective probe sequence that is being used at the transmit side, and on the fact that parallel characterization scheme is to be employed presently.

Communication controller CTRL-O signals towards the all communication controllers CTRL-Ri which symbol positions (same positions for all users) need to be used for characterization of the downstream direct communication channel in Band1, and at which time the transmission of the monitoring symbols will start, by signaling a set of control parameter values over a control communication channel (e.g., RMC). This is acknowledged by the communication controllers CTRL-Ri, after which the new parameters are made active at the indicated time instant.

During the signaled symbol positions in NOI, the signal transmitted from the local transmitters TX-$O_i$ towards the remote receivers RX-$R_i$ involve sub-carriers of Band1 that are modulated by the configured probe sequence. The sub-carriers of Band1 do not carry payload bits on any of the lines of the vectored group, and can be seen as monitored tones (i.e., bi=0 and gi>0). Concurrently, there may be actual payload communication over Band0 on one or more or all lines of the vectored group during the considered symbol positions.

The remote receivers RX-$R_i$ receives the signals at the corresponding symbol positions. The received signals are then processed to perform the characterization of the direct communication channel. In this process, the remote receiver can exploit the knowledge of the probe sequence.

Let us now describer the sequence of steps for a second use case, namely upstream, NOI, sequential characterization over Band1.

During SHOWTIME, we are in a situation where only Band0 is active. Further, the remote transmitter TX-$R_i$ has been informed on a PRBS that it should use (an orthogonal probe sequence could be used as well), and also on the fact that sequential characterization will be employed.

The communication controller CTRL-O signals towards all communication controllers CTRL-Ri which symbol positions (non-overlapping across lines) need to be used for characterization of the upstream direct communication channel in Band1, and at which time the transmission of the monitoring symbols will start, by signaling a set of control parameter values over a control communication channel (e.g., RMC). This is acknowledged by the communication controllers CTRL-Ri, after which the new parameter are made active after the indicated time instant.

During the signaled symbol positions in NOI, the signal transmitted from the transmitter TX-$R_i$ at the remote node towards the local receiver RX-$O_i$ involve sub-carriers of Band1 that are modulated by a PRBS. The sub-carriers of Band1 do not transmit payload bits. Concurrently, there may be actual payload communication over Band0 on one or more or all lines of the vectored group during the considered symbol positions.

The local receiver RX-$O_i$ receives the signals at the corresponding symbol positions. The received signals are then processed to perform the characterization of the direct communication channel. In this process, the local receiver can exploit the knowledge of the PRBS sequence.

Use cases with other combinations (DS/US, parallel/sequential, NOI/DOI) can be easily derived.

Although we focused on the use of DATA or RMC symbol positions for direct communication channel characterization, we can also signal specific SYNC symbol positions as being suitable for channel characterization, e.g. when SYNC symbols are properly precoded or postcoded with the precoder or postcoder settings intended for data transmission on that line.

We now present further details regarding the procedure for initializing during SHOWTIME the direct communication channels over the respective sub-carriers of Band1 during NOI.

Although DTFO as in [1][2] only considers a single active user in Band1 during the NOI, the present invention is also applicable to DTFO vectored operation, meaning more than 1 user active in Band 1 during the NOI, but less than N users, where N denotes the number of lines of the vectored group.

A new line (with DTFO capability) that initializes should follow a normal initialization procedure (e.g., as G.9701 initialization) to activate SHOWTIME (i.e., user data transmission) in Band0. At this point Band 1 is not initialized yet.

Band 1 will be initialized while Band0 is already in SHOWTIME, therefore we refer to it as "SHOWTIME initialization of Band 1".

Before we can start with the SHOWTIME initialization of Band 1, a pre-requisite is some a-priori information, including the initial PSD to be used for Band1 (STARTPSD_B1), and the content of the monitoring symbols (the probe sequence or PRBS) to be used in Band1. A careful choice of the STARTPSD_B1 is important to avoid negative impact on AFE settings (minor change in aggregate powers at transmit and receive sides). This a-priori information can be conveyed during the initialization of Band0, or in SHOWTIME using control messages in Band0, before SHOWTIME initialization of Band1.

Given that most parameters (e.g., symbol boundary, TDD boundary, electrical length estimates, etc) are already exchanged during Band0 initialization, Band1 initialization can be a very downsized procedure wrt normal initialization (as used for Band0). In fact, the only goal is to set a proper PSD, initialize/train the FEQ and/or TEQ, obtain a good estimation of the SNR and bitloading (and possibly optimized transmit gains) with reporting back to the transmitter. This can be achieved by transmitting monitoring symbols between the local transceiver xTU-0 and the remote transceiver xTU-R.

Let us describe SHOWTIME initialization for DTFO non-vectored operation in downstream during NOI.

The different signals that need to be exchanged are:
1) xTU-O:
   a) During SYNC symbol positions, the xTU-0 sends out a Band1 probe sequence (that was agreed during the Band0 initialization) with an initial PSD in Band1 (referred to as STARTPSD_B1_ds) that was also agreed during the Band0 initialization, or during SHOWTIME at a time before the SHOWTIME initialization of Band1.
   b) The xTU-O sends an RMC command specifying that SYNC symbols can be used for initialization and/or tracking of the receiver functions. The RMC command is transmitted over the RMC channel in Band0.
2) xTU-R:
   a) The xTU-R characterizes the direct communication channel and obtains an initial value for the FEQ, SNR, and bitloading (bi) and possibly for the TEQ and/or transmit gains (gi).
   b) The xTU-R re-estimates the desired downstream TX PSD and conveys it to the xTU-O (as an upper limit PSD mask or as a specific PSD value) using a control message transmitted over the control channels available in Band0.
3) xTU-O:
   a) In case of signaling an upper limit PSD mask in step 2b, the xTU-O signals the final specific PSD value to the xTU-R using a control message in Band0.
   b) The xTU-O sends a control command specifying the time positions of the monitoring symbols using the RMC commands transmitted over the RMC channel in Band0.
   c) During the specified DMT symbol positions, the xTU-O transmitter sends out the monitoring symbols with the new PSD.
4) xTU-R:
   a) The xTU-R re-characterizes the direct communication channel and obtains new values for the FEQ, SNR, and bit loading (bi), and possibly for the TEQ and/or transmit gains (gi).
   b) The xTU-R indicates to the XTU-O that the characterization is completed with success.
5) xTU-O:
   a) Initiates a request (O-D-SNR-REQ) for the characterization parameters such as DS SNR, bi request, and possibly gi values.
6) xTU-R:
   a) Responds with a message (R-D-SNR-RESP) with a reporting of the characterization parameters such as DS SNR, bi request, and possibly gi values. It may also include reporting on DS blackout sub-carriers requested by the CPE.

Non-vectored use cases with other combinations (DS/US, parallel/sequential, NOI/DOI) can be easily derived.

Let us next describe SHOWTIME initialization for DTFO vectored operation in downstream during NOI.

A new line that wants to activate Band1 for user data transmission will be referred to as a "joining DTFO line". Other lines that will use Band1 for user data transmission in the same DMT symbol positions as the joining DTFO line will be referred to as the "active lines" of the "DTFO vectored group".

The different signals that need to be exchanged are:
1) xTU-O of the joining DTFO line:
   a) ODV1: During SYNC symbol positions, the xTU-O transmitter sends out a Band1 probe sequence (i.e., the regular probe sequence that was agreed during Band0 initialization) with an initial PSD in Band1 (referred to as STARTPSD_B1_ds) that was also agreed during Band0 initialization, or during SHOWTIME at a time before the SHOWTIME initialization of Band1. The ODV1 signal on the joining DTFO line is typically non-precoded. Other active lines in the DTFO vectored group are assumed to be precoded in this use case. This signal allows an estimation of the downstream crosstalk channels from the joining DTFO line into the active lines of the DTFO vectored group (AJ, with A denoting active lines and J denoting joining lines).
2) xTU-O of other lines:
   a) The DPU initiates Transmitter Initiated Gain Adaptation (TIGA) procedures (as in G.9701) on the active lines of the DTFO vectored group.
   b) The DPU installs the new precoder coefficients values (AJ+diag(JJ)) on Band1.
3) xTU-O of the joining DTFO line:
   a) The xTU-O of the joining DTFO line, transmits SYNC symbols in Band1 with a new PSD (referred to as CDPSD_B1_ds). This signal on the joining DTFO line is typically non-precoded.
   b) The xTU-O sends an RMC command specifying that SYNC symbols can be used for initialization and/or tracking of the receiver functions. The RMC command is transmitted over the RMC channel in Band0.
4) xTU-R:
   a) The xTU-R characterizes the direct communication channel.
   b) The xTU-R may obtain an initial value for the FEQ, SNR, and bitloading (bi), and possibly for the TEQ and/or transmit gains (gi).
   c) The xTU-R re-estimates the desired downstream TX PSD and conveys it to the XTU-O (as an upper limit PSD mask (e.g. MAXMASK_B1_ds), or as a specific PSD value) using a control message (R-D-UPDATE) transmitted over the control channels available in Band0.
5) xTU-O of the joining DTFO line:
   a) In case of signaling an upper limit PSD mask in step 4c, the final PSD may be determined using a predetermined rule in function of this upper limit and the CDPSD_B1_ds. In this case both sides can apply this rule to obtain the final PSD without additional signaling. Alternatively, if no predetermined rule is used, the xTU-O may signal its decision on the final specific PSD (referred to as V2PSD_B1_ds) value to the xTU-R using a control message in Band0.
   b1) ODV2-Alt1: In a first alternative, SYNC symbols are used for the characterization of the direct communication channel.
      i) The xTU-O sends a control command specifying that it will transmit SYNC symbols suitable for characterization of the direct communication channel, starting from a certain position in time. This control command can be transmitted over the RMC channel in Band0. This also indicates to the xTU-R that characterization should be done using these SYNC symbols.
      ii) During the specified SYNC symbol positions, the xTU-O transmitter sends out the SYNC symbols in Band1, using a Band1 probe sequence (i.e., the regular probe sequence that was agreed during Band0 initialization), with the new PSD (referred to as V2PSD_B1_ds). This signal on the joining DTFO line is typically non-precoded.
   b2) ODV2-Alt2: In a second alternative, monitoring symbols are used for the characterization of the direct communication channel.
      i) The xTU-O sends a control command specifying that it will transmit, starting from a certain position in time, monitoring symbols suitable for characterization of the direct communication channel, at certain specific symbol positions within the logical frame. This control command can be transmitted over the RMC channel in Band0. This also indicates to the xTU-R that characterization should be done using these monitoring symbols.
      ii) The xTU-O also indicates to the xTU-R the probe sequence (out of a set of orthogonal sequences) that shall be used to generate the monitoring symbols. This may be the probe sequence used by the SYNC symbol, or it may be a different probe sequence (communicated from xTU-O to xTU-R).
      iii) During the specified DMT symbol positions, the xTU-O transmitter sends out the monitoring symbols in Band1 with the new PSD (referred to as V2PSD_B1_ds). This signal on the joining DTFO line is typically non-precoded.
   c) The DPU xTU-O sends a control message to the xTU-R to specify the type of vectoring feedback that is required (DFT output reporting, or error feedback).
6) xTU-R of the joining DTFO line
   a) In case error feedback is requested as vectoring feedback type, the xTU-R characterizes the direct communication channel and obtains a new value for the FEQ.
   b) Vectoring feedback is provided from the xTU-R to the DPU using a control message (R-D-VECTOR-FEEDBACK) via upstream in Band0.
7) xTU-O
   a) The access node executes an estimation of the downstream crosstalk channels from the active lines of the DTFO vectored group (JA) into the joining DTFO line.
   b) When the access node has finished the estimation, it sends a command over RMC that it will stop transmitting SYNC and/or monitoring symbols suitable for characterization of the direct communication channel, starting from a certain position in time.
   c) The access node calculates new precoder coefficient values (=AJ+JJ+JA).
   d) The DPU initiates TIGA procedures on the active lines of the DTFO vectored group
   e) On the joining DTFO line, in case of error feedback has been used (trained FEQ at XTU-R), the DPU initiates a TIGA on the joining DTFO line, using a control message over control channels available in Band0.
   f) The DPU installs the new precoder coefficients values (=AJ+JJ+JA) on Band1.

8) xTU-R (on all lines that received a TIGA message):
   a) Adapt the FEQ with ri value of the TIGA message.
9) XTU-O of the joining DTFO line: O-D-PRM-UPDATE
   a1) O-D-PRM-UPDATE-Alt1: In a first alternative, SYNC symbols are used for the characterization of the direct communication channel.
      i) The xTU-O sends a control command specifying that it will transmit SYNC symbols suitable for characterization of the direct communication channel, starting from a certain position in time. This control command can be transmitted over the RMC channel in Band0. This also indicates to the xTU-R that characterization should be done using these SYNC symbols.
      ii) During the specified SYNC symbol positions, the xTU-O transmitter sends out the SYNC symbols in Band1, using a Band1 probe sequence (i.e., the regular probe sequence that was agreed during the Band0 initialization), with the new PSD (referred to as PRMPSD_B1_ds). This signal on the joining DTFO line is now typically precoded.
   a2) O-D-PRM-UPDATE-Alt2: In a second alternative, monitoring symbols are used for the characterization of the direct communication channel.
      i) The xTU-O sends a control command specifying that it will transmit, starting from a certain position in time, monitoring symbols suitable for characterization of the direct communication channel, at certain specific symbol positions within the logical frame. This control command can be transmitted over the RMC channel in Band0. This also indicates to the xTU-R that characterization should be done using these monitoring symbols.
      ii) The xTU-O also indicates to the XTU-R whether and which probe sequence (out of a set of orthogonal sequences) shall be used to generate the monitoring symbols, or whether a PRBS will be used. The probe sequence may be the one used by the SYNC symbol, or may be a different probe sequence (communicated from xTU-O to xTU-R).
      iii) During the specified DMT symbol positions, the xTU-O transmitter of the joining DTFO line, sends out the monitoring symbols in Band1 with a new PSD (referred to as PRMPSD_B1_ds). This signal on the joining DTFO line is now typically precoded.
10) xTU-R of the joining DTFO line:
   a) The xTU-R re-characterizes the direct communication channel and may obtain new values for the FEQ, and obtains new values for the SNR, bitloading (bi), and possibly for the TEQ and/or transmit gains (gi).
   b) The xTU-R indicates to the XTU-O that the characterization is completed with success.
11) xTU-O (typically on all lines):
   a) Initiates a request (O-D-SNR) for the characterization parameters such as DS SNR, bi request, and possibly gi values.
12) xTU-R:
   Responds with a message (R-D-SNR) with a reporting of the characterization parameters such as DS SNR, bi request, and possibly gi values. It may also include reporting on DS blackout sub-carriers requested by the CPE.

Let us next describe SHOWTIME initialization for DTFO vectored operation in upstream during NOI.

The different signals that need to be exchanged are:
1) xTU-R of the joining DTFO line:
   a) RDV1: During SYNC symbol positions, the xTU-R transmitter sends out a Band1 probe sequence (i.e., the regular probe sequence that was agreed during Band0 initialization) with an initial PSD in Band1 (referred to as STARTPSD_B1_us) that was also agreed during Band0 initialization, or during SHOWTIME at a time before SHOWTIME initialization of Band1. This signal allows an estimation of the upstream crosstalk channels from the joining DTFO line into the active lines of the DTFO vectored group (AJ), and from the active lines of the DTFO vectored group into the joining DTFO line (JA).
2) xTU-O on all lines:
   a) The DPU installs the new postcoder coefficients values (=AJ+JJ+JA) on Band1.
3) xTU-O on the joining DTFO line:
   a1) RDCD2-Alt1: In a first alternative, SYNC symbols are used for the characterization of the direct communication channel.
      i) The xTU-O does not need to send a control command to the xTU-R.
   a2) RDCD2-Alt2: In a second alternative, monitoring symbols are used for the characterization of the direct communication channel.
      i) The xTU-O sends a control command requesting the xTU-R to transmit, starting from a certain position in time, monitoring symbols suitable for characterization of the direct communication channel, at certain specific symbol positions within the logical frame. This control command can be transmitted over the RMC channel in Band0.
      ii) The xTU-O also indicates to the xXTU-R whether and which probe sequence (out of a set of orthogonal sequences) shall be used to generate the monitoring symbols, or whether a PRBS will be used. The probe sequence may be the one used by the SYNC symbol, or may be a different probe sequence (communicated from xTU-O to xTU-R).
4) xTU-R on the joining DTFO line:
   a1) RDCD2-Alt1: In this first alternative with SYNC symbols.
      i) The xTU-R transmitter sends out the SYNC symbols in Band1, using a Band1 probe sequence (i.e. the regular probe sequence that was agreed during Band0 initialization), with the initial PSD (referred to as STARTPSD_B1_us).
   a2) RDCD2-Alt2: In this second alternative with monitoring symbols.
      i) During the specified DMT symbol positions, the xTU-R transmitter sends out the monitoring symbols (probe sequence or PRBS as specified by xTU-O) in Band1 with the initial PSD (referred to as STARTPSD_B1_ds).
5) xTU-O on the joining DTFO line:
   a) The xTU-O characterizes the direct communication channel.
   b) The xTU-O may obtain an initial value for the FEQ, SNR, and bitloading (bi), and possibly for the TEQ and/or transmit gains (gi).
   c) The xTU-O re-estimates the desired downstream TX PSD and conveys it to the xTU-R (as an upper limit PSD mask (e.g. MAXMASK_B1_us), or as a specific PSD value) using a control message (O-D-UPDATE) transmitted over the control channels available in Band0.

6) xTU-R of the joining DTFO line:
   a) In case of signaling an upper limit PSD mask in step 5c, the final PSD may be determined using a predetermined rule in function of this upper limit and the STARTPSD_B1_us. In this case both sides can apply this rule and obtain the final PSD without additional signaling. Alternatively, if no predetermined rule is used, the xTU-R may signal the final specific PSD value (referred to as CDPSD_B1_us) to the xTU-O using a control message in Band0.
7) xTU-O of the joining DTFO line:
   a1) RDV11-Alt1: In a first alternative, SYNC symbols are used for the characterization of the direct communication channel.
      i) The XTU-O does not need to send a control command to the XTU-R.
   a2) RDV11-Alt2: In a second alternative, monitoring symbols are used for the characterization of the direct communication channel.
      i) The xTU-O sends a control command requesting the xTU-R to transmit, starting from a certain position in time, monitoring symbols suitable for characterization of the direct communication channel, at certain specific symbol positions within the logical frame. This control command can be transmitted over the RMC channel in Band0.
      ii) The xTU-O also indicates to the xTU-R whether and which probe sequence (out of a set of orthogonal sequences) shall be used to generate the monitoring symbols, or whether a PRBS will be used. The probe sequence may be the one used by the SYNC symbol, or may be a different probe sequence (communicated from xTU-O to xTU-R).
8) xTU-R on the joining DTFO line:
   a1) RDV11-Alt1: In this first alternative with SYNC symbols.
      i) The xTU-R transmitter sends out the SYNC symbols in Band1, using a Band1 probe sequence (i.e. the regular probe sequence that was agreed during the Band0 initialization) with the new PSD (referred to as CDPSD_B1_us).
   a2) RDV11-Alt2: In this second alternative with monitoring symbols.
      i) During the specified DMT symbol positions, the xTU-R transmitter sends out the monitoring symbols (probe sequence or PRBS as specified by xTU-O) in Band1 with the new PSD (referred to as CDPSD_B1_us).
9) xTU-O on the joining DTFO line:
   a) The xTU-O re-characterizes the direct communication channel and obtains new values for the FEQ, SNR, and bitloading (bi), and possibly for the TEQ and/or transmit gains (gi).
   b) The xTU-O indicates to the CTRL-O that the characterization is completed with success.
   c) The CTRL-O initiates a DPU internal request for the characterization parameters such as US SNR, and bi and possibly gi values.
   d) The xTU-O responds with a DPU internal message with a reporting of the characterization parameters such as US SNR, bi, and possibly gi values. It may also include reporting on US blackout sub-carriers requested by the xTU-O.
   e) The xTU-O indicates to the xTU-R that the characterization is completed with success.
10) xTU-R:
   a) Initiates a request (R-D-SNR-REQ) for the characterization parameters such as US SNR, bi request, and possibly gi values.
11) xTU-O:
   a) Responds with a message (O-D-SNR-RESP) with a reporting of the characterization parameters such as US SNR, bi, and possibly gi values. It may also include reporting on US blackout subcarriers requested by the xTU-O.

Vectored use cases with other combinations (parallel, NOI/DOI) can be easily derived by a person skilled in the art.

LIST OF ABBREVIATIONS

AFE Analog Front End
ADC Analog to Digital Converter
CPE Customer Premises Equipment
DAC Digital to Analog Converter
DMT Discrete Multi-Tone
DOI Discontinuous Operation Interval
DPU Distribution Point Unit
DS Downstream
DSL Digital Subscriber Line
DSLAM Digital Subscriber Line Access Multiplexer
DSP Digital Signal Processor
DTFO Discontinuous Time-Frequency Operation
FEQ frequency domain equalization
ICI Inter Channel Interference
ISI Inter Symbol Interference
ITU International Telecommunication Union
LMS Least Mean Square
TIGA Transmitter Initiated Gain Adaptation
TU Transceiver Unit
NOI Normal Operation Interval
PSD Power Spectral Density
RMC Robust Management Channel
SNR Signal to Noise Ratio
TDD Time Division Duplexing
US Upstream
VP Vectoring Processor

The invention claimed is:

1. An access node comprising at least one processor and memory storing instructions that when executed by the at least one processor cause a local transceiver of the access node to transmit signaling data via a subscriber line to a remote transceiver during transmission of user data via the subscriber line, the signaling data identifying particular symbol positions within a sequence of symbols transmitted over the subscriber line as being suitable for characterizing a direct communication channel between the local transceiver and the remote transceiver.

2. An access node according to claim 1, wherein the characterized direct communication channel is a direct communication channel from a local transmitter within the local transceiver to a remote receiver within the remote transceiver.

3. An access node according to claim 1, wherein the characterized direct channel is a direct communication channel from a remote transmitter in the remote transceiver to a local receiver in the local transceiver.

4. An access node according to claim 1, wherein the characterization of the direct communication channel is restricted to a first portion of a communication spectrum used for communication between the local transceiver and the remote transceiver.

5. An access node according to claim 4, wherein at least one sub-carrier of symbols transmitted during the particular symbol positions and belonging to a second non-overlapping portion of the communication spectrum are modulated with user data or with Robust Management Channel RMC data.

6. An access node according to claim 1, wherein the particular symbol positions correspond to particular SYNC symbol positions.

7. An access node according to claim 1, wherein the characterization of the direct communication channel comprises at least one of:
initializing or updating coefficients of a channel equalizer;
determining at least one Signal to Noise Ratio SNR on at least one sub-carrier;
determining at least one bit loading achievable on at least one sub-carrier; or
determining at least one transmit gain for at least one sub-carrier.

8. An access node according to claim 1, wherein at least one sub-carrier of symbols transmitted during the particular symbol positions are modulated with a probe sequence chosen from a set of mutually orthogonal probe sequences.

9. An access node according to claim 1, wherein at least one sub-carrier of symbols transmitted during the particular symbol positions are modulated with a pseudo-random data sequence.

10. An access node according to claim 2, wherein the instructions when executed by the at least one processor further causes the local transceiver to transmit further signaling data via the subscriber line to the remote transceiver, the further signaling data being indicative of an allowable type of channel characterization usable by the remote receiver.

11. An access node according to claim 10, wherein at least one sub-carrier of symbols transmitted during the particular symbol positions are modulated with a probe sequence chosen from a set of mutually orthogonal probe sequences, and wherein the allowable type of channel characterization comprises correlating signal measurements performed by the remote receiver during the particular symbol positions on the at least one sub-carrier with elements of the probe sequence used by the local transmitter.

12. An access node according to claim 3, wherein at least one sub-carrier of symbols transmitted during the particular symbol positions are modulated with a probe sequence chosen from a set of mutually orthogonal probe sequences, wherein the characterization of the direct communication channel comprises correlating signal measurements performed by the local receiver during the particular symbol positions on the at least one sub-carrier with elements of the probe sequence used by the remote transmitter.

13. An access node according to claim 1, wherein the particular symbol positions refer to relative positions within a Time Division Duplexing TDD frame, or a logical frame, or a superframe.

14. A subscriber device comprising at least one processor and memory storing instructions that when executed by the at least one processor causes a local transceiver of the subscriber device to receive signaling data via a subscriber line from a remote transceiver during transmission of user data via the subscriber line, the signaling data identifying particular symbol positions within a sequence of symbols transmitted over the subscriber line during show-time as being suitable for characterizing a direct channel (DS, US) between the local transceiver and the remote transceiver.

15. A subscriber device according to claim 14, wherein the characterized direct communication channel is a direct communication channel from a remote transmitter in the remote transceiver to a local receiver in the local transceiver, and wherein the instructions when executed by the at least one processor further causes the local receiver, in response to the reception of the signaling data, to characterize the direct communication channel during the particular symbol positions.

16. A subscriber device according to claim 15, wherein the characterization of the direct communication channel comprises at least one of:
initializing or updating coefficients of a channel equalizer;
determining at least one Signal to Noise Ratio SNR on at least one sub-carrier;
determining at least one bit loading achievable on at least one sub-carrier; or
determining at least one transmit gain for at least one sub-carrier.

17. A subscriber device according to claim 15, wherein the characterization of the direct communication channel comprises correlating signal measurements performed by the local receiver during the particular symbol positions on at least one sub-carrier with elements of a probe sequence chosen from a set of mutually orthogonal probe sequences and used by the remote transmitter to modulate the at least one sub-carrier during the particular symbol positions.

18. A subscriber device according to claim 14, wherein the characterized direct communication channel is a direct communication channel from a local transmitter in the local transceiver to a remote receiver in the remote transceiver, and wherein the instructions when executed by the at least one processor further causes the local transmitter, in response to the reception of the signaling data, to modulate at least one sub-carrier of symbols transmitted during the particular symbol positions with a probe sequence chosen from a set of mutually orthogonal probe sequences or with a pseudo-random data sequence.

19. A method for initializing or updating communication parameters within a wired communication system, the method comprising transmitting signaling data via a subscriber line from a local transceiver of an access node to a remote transceiver during transmission of user data via the subscriber line, the signaling data identifying particular symbol positions within a sequence of symbols transmitted over the subscriber line during show-time as being suitable for characterizing a direct communication channel between the local transceiver and the remote transceiver.

* * * * *